United States Patent
Klein et al.

(10) Patent No.: US 9,674,635 B2
(45) Date of Patent: Jun. 6, 2017

(54) METHOD AND APPARATUS FOR DISTRIBUTION OF APPLICATIONS TO A PLURALITY OF COMMUNICATION DEVICES FOR AN EXPANDED OPERATING MODE

(75) Inventors: David E. Klein, Davie, FL (US); Eric D. Brooks, Coral Springs, FL (US); Steven E. Young, Hillsboro Beach, FL (US); Deborah J. Monks, Palatine, IL (US); Alejandro G. Blanco, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 688 days.

(21) Appl. No.: 12/749,142

(22) Filed: Mar. 29, 2010

(65) Prior Publication Data
US 2011/0238726 A1 Sep. 29, 2011

(51) Int. Cl.
*G06F 15/16* (2006.01)
*H04W 4/00* (2009.01)
(Continued)

(52) U.S. Cl.
CPC .............. *H04W 4/00* (2013.01); *G06Q 30/04* (2013.01); *G06Q 30/0601* (2013.01)

(58) Field of Classification Search
CPC .................................................. H04L 67/104
(Continued)

(56) References Cited

U.S. PATENT DOCUMENTS 5,045,839 A 9/1991 Ellis et al.
5,179,721 A 1/1993 Comroe et al.
(Continued)

FOREIGN PATENT DOCUMENTS

CN 1230090 A 9/1999
CN 1416632 A 5/2003
(Continued)

OTHER PUBLICATIONS

Korean Intellectual Property Office (KIPO) Notice of Preliminary Rejection (TRANSLATION)—mailed Dec. 30 2009—3 pages.
(Continued)

*Primary Examiner* — Liangche A Wang
*Assistant Examiner* — Sherman Lin
(74) *Attorney, Agent, or Firm* — Barbara R. Doutre (57) ABSTRACT

Applications are provided to communication devices provide flexible operation between default modes of operation and an expanded mode of operation in which both communication devices share capabilities. A purchase order is created for a plurality of communication devices. A determination is made as to whether a collaboration feature is enabled at each device. The collaboration feature being enabled at each device results in additional revenue to the ordering process. If collaboration is enabled at both devices at 306, 312, and then collaboration operation are enabled 316 which allows for predetermined operating features to be registered and additional revenue applied. The communication devices 102, 104 are then automatically linked (via information sharing link 120 using linkage application 140) to share capabilities of the registered features at 320. The resulting order comprises a plurality of communication devices that provided an expanded mode of operation when operating together.

28 Claims, 3 Drawing Sheets (51) Int. Cl.
*G06Q 30/04* (2012.01)
*G06Q 30/06* (2012.01)

(58) Field of Classification Search
USPC .................. 709/202, 204; 705/1.1, 26.1, 34
See application file for complete search history.

(56) References Cited

U.S. PATENT DOCUMENTS

| | | | |
|---|---|---|---|
| 6,069,896 A * | 5/2000 | Borgstahl | 370/260 |
| 6,496,508 B1 | 12/2002 | Breuckheimer et al. | |
| 6,917,586 B1 | 7/2005 | Mauger et al. | |
| 7,103,890 B2 | 9/2006 | Bush | |
| 7,330,895 B1 * | 2/2008 | Horvitz | 709/227 |
| 7,382,247 B2 | 6/2008 | Welch et al. | |
| 7,382,786 B2 | 6/2008 | Chen et al. | |
| 7,610,354 B2 | 10/2009 | Adams et al. | |
| 7,613,721 B2 | 11/2009 | Horvitz et al. | |
| 7,613,773 B2 | 11/2009 | Watt | |
| 7,617,328 B2 | 11/2009 | Lewis et al. | |
| 7,624,189 B2 | 11/2009 | Bucher | |
| 7,624,421 B2 | 11/2009 | Ozzie et al. | |
| 7,715,794 B2 | 5/2010 | Hulvey | |
| 7,928,851 B2 | 4/2011 | Stanners et al. | |
| 8,041,305 B2 | 10/2011 | Keller et al. | |
| 8,112,061 B2 | 2/2012 | Bolin | |
| 8,135,333 B2 | 3/2012 | Thomas et al. | |
| 8,208,891 B2 | 6/2012 | Jacobs et al. | |
| 8,380,160 B2 | 2/2013 | Monks et al. | |
| 8,504,090 B2 | 8/2013 | Klein et al. | |
| 8,676,243 B2 | 3/2014 | Blanco | |
| 8,850,196 B2 | 9/2014 | Blanco et al. | |
| 8,880,110 B2 | 11/2014 | Klein et al. | |
| 8,897,827 B2 | 11/2014 | Klein et al. | |
| 8,903,446 B2 | 12/2014 | Klein et al. | |
| 2004/0037243 A1 | 2/2004 | Inoue et al. | |
| 2004/0054597 A1 * | 3/2004 | Gulliver et al. | 705/26 |
| 2004/0068551 A1 * | 4/2004 | Hymel et al. | 709/217 |
| 2004/0203978 A1 | 10/2004 | Wong et al. | |
| 2004/0261126 A1 * | 12/2004 | Addington et al. | 725/135 |
| 2005/0207424 A1 | 9/2005 | Hallin | |
| 2005/0265256 A1 | 12/2005 | Delaney | |
| 2007/0139182 A1 * | 6/2007 | O'Connor | G08B 27/006 340/521 |
| 2007/0211866 A1 | 9/2007 | Sink | |
| 2008/0098454 A1 | 4/2008 | Toh | |
| 2008/0183825 A1 * | 7/2008 | Alicherry | H04L 12/12 709/206 |
| 2009/0018890 A1 * | 1/2009 | Werth | G06Q 10/06312 705/7.14 |
| 2009/0160641 A1 | 6/2009 | Stanners et al. | |
| 2009/0207768 A1 | 8/2009 | Wang et al. | |
| 2009/0265475 A1 * | 10/2009 | Fujita | 709/231 |
| 2009/0280771 A1 | 11/2009 | Bolin | |
| 2010/0279647 A1 | 11/2010 | Jacobs et al. | |
| 2010/0303005 A1 | 12/2010 | Gossain et al. | |
| 2011/0237217 A1 | 9/2011 | Monks et al. | |
| 2011/0274021 A1 | 11/2011 | He et al. | |
| 2011/0299478 A1 | 12/2011 | Clark | |
| 2012/0147780 A1 | 6/2012 | Gossain et al. | |
| 2013/0107041 A1 | 5/2013 | Norem et al. | |
| 2013/0122811 A1 | 5/2013 | Scribano et al. | |
| 2013/0244714 A1 | 9/2013 | Klein et al. | |

FOREIGN PATENT DOCUMENTS

| | | | |
|---|---|---|---|
| CN | 101030999 A | | 9/2007 |
| EP | 1768323 A1 * | | 3/2007 |
| EP | 1768436 A2 | | 3/2007 |
| EP | 1928161 A1 | | 6/2008 |
| EP | 2 375 716 A1 | | 10/2011 |
| GB | 2423888 A | | 9/2006 |
| WO | 2008027750 A1 | | 3/2008 |
| WO | 2008027750 A2 | | 3/2008 |
| WO | 2008027750 A4 | | 3/2008 |

OTHER PUBLICATIONS

Sumit Roy et al "Capacity Scaling with Multiple Radios and Multiple channels in Wireless Mesh Networks"—IEEE WiMesh, Sep. 2005—10 pages.
PCT International Search Report Dated Mar. 21, 2011.
PCT International Preliminary Report on Patentability and Written Opinion on related Application No. PCT/US2010/060961 dated Oct. 2, 2012.
International Search Report and Written Opinion for related International Patent Application No. PCT/US2010/060922 mailed Apr. 19, 2011.
Notice of Allowance mailed Feb. 4, 2013 in related U.S. Appl. No. 12/749,194, David E. Klein, filed Mar. 29, 2010.
Final Office Action mailed Jun. 22, 2012 in related U.S. Appl. No. 12/749,194, David E. Klein, filed Mar. 29, 2010.
Non-Final Office Action mailed Apr. 30, 2012 in related U.S. Appl. No. 12/749,194, David E. Klein, filed Mar. 29, 2010.
International Preliminary Report on Patentability and Written Opinion for related International Patent Application No. PCT/US2010/060922 issued on Oct. 2, 2012.
International Search Report and Written Opinion for related International Patent Application No. PCT/US2010/061214 mailed Apr. 20, 2011.
International Preliminary Report on Patentability and Written Opinion for related International Patent Application No. PCT/US2010/061214 issued on Oct. 2, 2012.
Notice of Allowance mailed Dec. 7, 2012 in related U.S. Appl. No. 12/749,248, Deborah J. Monks, filed Mar. 29, 2010.
Notice of Allowance mailed Aug. 28, 2012 in related U.S. Appl. No. 12/749,248, Deborah J, Monks, filed Mar. 29, 2010.
Non-Final Office Action mailed May 14, 2012 in related U.S. Appl. No. 12/749,248, Deborah J Monks, filed Mar. 29, 2010.
Notice of Allowance mailed May 28, 2013 in U.S. Appl. No. 12/749,194, David E. Klein, filed Mar. 29, 2010.
Australian Patent Examination Report No. 1 for Australian Patent Application No. 2010349742 issued on Sep. 27, 2013.
Australian Patent Examination Report No. 2 for Australian Patent Application No. 2010349742 issued on Nov. 8, 2013.
Non-Final Office Action mailed Dec. 26, 2013 in U.S. Appl. No. 13/873,453, David E. Klein, filed Apr. 30, 2013.
Non-Final Office Action mailed Dec. 20, 2013 in U.S. Appl. No. 13/873,352, David E. Klein, filed Apr. 30, 2013.
Non-Final Office Action mailed Dec. 20, 2013 in U.S. Appl. No. 13/873,502, David E. Klein, filed Apr. 30, 2013.
Notice of Allowance mailed Dec. 4, 2013 in U.S. Appl. No. 13/873,522, David E. Klein, filed Apr. 30, 2013.
Intention to Grant mailed Jun. 24, 2014, for corresponding European Patent Application No. 10 800 829.3, filed Dec. 17, 2010.
Decision to Grant mailed Nov. 13, 2014, for corresponding European Patent Application No. 10 800 829.3, filed Dec. 17, 2010.
Patent Examination Report No. 1 mailed Sep. 27, 2013, for corresponding Australian Patent Application No. 2010349744, filed Dec. 17, 2010.
Notice of Acceptance mailed Mar. 28, 2014, for corresponding Australian Patent Application No. 2010349744, filed Dec. 17, 2010.
Office Action mailed Sep. 8, 2014, for corresponding Canadian Patent Application No. 2 794 612, filed Dec. 17, 2010.
Notice of Allowance mailed Jul. 14, 2015, for corresponding Canadian Patent Application No. 2 794 612, filed Dec. 17, 2010.
English-language translation of First Office Action mailed Jul. 25, 2014, for corresponding Chinese Patent Application No. 201080065989.4, filed Dec. 17, 2010.
English-language translation of Second Office Action mailed Apr. 17, 2015, for corresponding Chinese Patent Application No. 201080065989.4, filed Dec. 17, 2010.
English-language translation of Notice of Allowance mailed Aug. 7, 2015, for corresponding Chinese Patent Application No. 201080065989.4, filed Dec. 17, 2010.
English-language translation of Notice of Preliminary Rejection mailed Mar. 31, 2014, for corresponding Korean Patent Application No. 10-2012-7028165, filed Dec. 17, 2010.

(56) References Cited

OTHER PUBLICATIONS

English-language translation of Notice of Last Preliminary Rejection mailed Jul. 31, 2014, for corresponding Korean Patent Application No. 10-2012-7028165, filed Dec. 17, 2010.
Intention to Grant mailed Dec. 18, 2013, for corresponding European Patent Application No. 10 798 915.4, filed Dec. 20, 2010.
Decision to Grant mailed Mar. 6, 2014, for corresponding European Patent Application No. 10 798 915.4, filed Dec. 20, 2010.
Office Action mailed May 26, 2014, for corresponding Canadian Patent Application No. 2,793,591, filed Dec. 20, 2010.
Advisory Action mailed Sep. 19, 2012, in U.S. Appl. No. 12/749,194, Klein D.E. et al., filed Mar. 29, 2010.
Intention to Grant mailed Mar. 24, 2014, for corresponding European Patent Application No. 10 795 9025, filed Dec. 17, 2010.
Decision to Grant mailed Aug. 7, 2014, for corresponding European Patent Application No. 10 795 902.5, filed Dec. 17, 2010.
Notice of Acceptance mailed Jul. 10, 2014, for corresponding Australian Patent Application No. 2010349742, filed Dec. 17, 2010.
English-language translation of Notice of Preliminary Rejection mailed Nov. 29, 2013, for corresponding Korean Patent Application No. 10-2012-7028162, filed Dec. 17, 2010.
European Search Report and Opinion for corresponding European Patent Application No. 14 178 113.8, mailed on Nov. 5, 2014.
Intention to Grant mailed Sep. 22, 2015, for corresponding European Patent Application No. 14 178 113.8, filed Dec. 17, 2010.
Decision to Grant mailed Feb. 11, 2016, for corresponding European Patent Application No. 14 178 113.8, filed Dec. 17, 2010.
Examiner's Requisition mailed Sep. 3, 2015, for corresponding Canadian Patent Application No. 2,891,567, filed Dec. 17, 2010.
Notice of Allowance mailed Jun. 6, 2014, in U.S. Appl. No. 13/873,352, Klein D.E. et al., filed Apr. 30, 2013.
Notice of Allowance mailed Oct. 20, 2014, in U.S. Appl. No. 13/873,352, Klein D.E. et al., filed Apr. 30, 2013.
Notice of Allowance mailed Jun. 9, 2014, in U.S. Appl. No. 13/873,453, Klein D.E. et al., filed Apr. 30, 2013.
Notice of Allowance mailed Oct. 16, 2014, in U.S. Appl. No. 13/873,453, Klein D.E. et al., fiied Apr. 30, 2013.
Notice of Allowance mailed Jun. 11, 2014, in U.S. Appl. No. 13/873,502, Klein D.E. et al., filed Apr. 30, 2013.
Notice of Allowance mailed Sep. 12, 2014, in U.S. Appl. No. 13/873,502, Klein D.E. et al., filed Apr. 30, 2013.
Notice of Allowance mailed Apr. 1, 2014, in U.S. Appl. No. 13/873,522, Klein D.E. et al., filed Apr. 30, 2013.
English-language translation of Notification Prior to Examination mailed Jan. 11, 2015, for corresponding Israeli Patent Application No. 222102, filed Dec. 17, 2010.
First Official Notification mailed Aug. 30, 2015, for corresponding Israeli Patent Application No. 222102, filed Dec. 17, 2010.

* cited by examiner

METHOD AND APPARATUS FOR DISTRIBUTION OF APPLICATIONS TO A PLURALITY OF COMMUNICATION DEVICES FOR AN EXPANDED OPERATING MODE

CROSS REFERENCE TO RELATED APPLICATIONS

This application is related to co-pending U.S. patent applications, Ser. No. 12/749,194 and Ser. No. 12/749,248, filed concurrently herewith and commonly assigned to Motorola, Inc.

FIELD OF THE DISCLOSURE

The present disclosure relates generally to communication systems, and more particularly, to a means of distributing public safety applications to communication devices for an expanded public safety mode of operation.

BACKGROUND

Public safety personnel, such as police officers, firefighters, paramedics and the like typically utilize numerous communication devices while working in the field. Public safety communication devices include, for example, mobile radios such as handheld radios and/or vehicular radios along with remote accessories, such as remote microphones, speakers, earpieces, headsets and the like. These primary, mission critical devices are typically accomplished utilizing a narrowband system operating via a private network governed by a public safety agency. Updates to public safety communication devices in the form of application software are usually accomplished at a factory or service shop.

Public safety personnel often carry additional non-mission critical devices, such as cell phones, personal digital assistants, electronic notepads and the like which operate over a broadband connection. Updates to these types of devices in the form of application software typically occur at a retail store by having the user purchase and download software into the device.

Public safety and non public safety communication devices operate independently of each other and as mentioned previously receive software updates at different types of locations using different equipment. In certain situations, such as a public safety situation, it would be desirable to have the two types of devices interoperate in a cooperative manner. As such, providing a means of distributing and uploading applications to public safety and non public safety devices is highly desirable.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components and method steps related to facilitating the efficient programming and distribution of public safety applications to public safety communication devices and non public safety communication devices for a shared mode of operation, such as an expanded public safety mode of operation. The ability to distribute and sell specific software applications that support peer linkage and information sharing between the different types of communication devices is provided.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
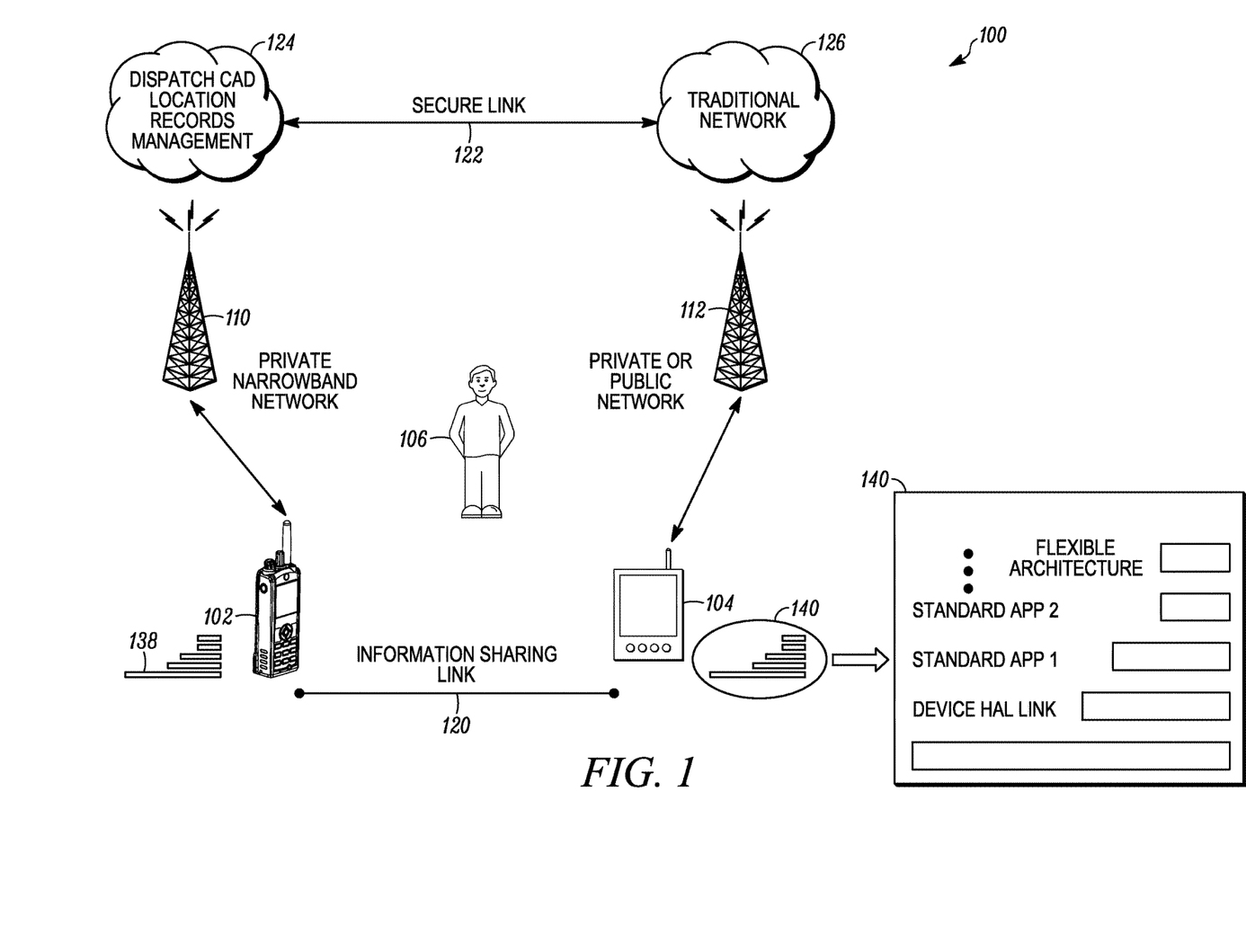
FIG. 1 is a communication system operating in a shared mode of operation in accordance with an embodiment of the invention.

FIG. 1 shows an overall communication system 100 provided to the end user 106 operating under a safety net that allows for the creation of additional safety information delivered in a proper form and to an appropriate device. Communication system 100 provides communication devices formed of at least one public safety communication device 102 and at least one non public safety communication device 104. The public safety communication device 102 operates over a narrowband network and is governed under a public safety agency. The non public safety communication device 104 operates over a broadband network. These different devices 102, 104 when purchased and operating separately, provide independent communication via a private narrowband network 110 and traditional network (private or public network) 112. However, when purchased and distributed in accordance with the distribution method to be described herein, the communication devices 102, 104 are further enhanced through an information sharing link 120 achieved by operating the devices 102, 104 over a short range network during a sharing mode of operation. The sharing mode of operation is used to expand the features of the public safety communication device 102 through the use of non public safety communication device 104.

The information sharing link 120 is achieved through a peer to peer network, the linked communication devices 102, 104 support public safety information and status sharing via a safety net application that controls the delivery of safety information to and from the linked communication devices. The safety net application ensures that information is sent to the most appropriate communication device (102 or 104) and to the most appropriate user interface element of that communication device. The communication system 100 when operating in this shared mode of operation further utilizes a secure link 122 to interconnect a dispatch and records management center 124 to and from a traditional network 126. The communication devices 102, 104 operating in accordance with the shared mode of operation are programmed with linkage application 138 and linkage application 140 respectively. The linkage applications 138, 140 provide a common functional software link shared between both (or N number) of communication devices. An example of the flexible architecture provided by the linkage application 140 is further discussed in association with FIG. 2.

The first and second communication devices have default operation on different communication systems, and the linkage applications 138, 140 offered by a supplier are downloadable to the devices 102, 104. The linkage applications 138, 140 provide collaborative operation and information sharing amongst the devices 102, 104 during the sharing mode of operation. The linkage applications control the enablement of features for a predetermined optimized user interface amongst the devices 102, 104, the sharing mode of operation preferably being implemented as an expanded public safety mode of operation.

As an example, when the public safety communication device 102 goes into an emergency mode, the second (or N) device 104 is alerted to the emergency mode and may, for example, automatically enable voice recognition. Subsequent commands from the user 106 are received by the second device 104 and routed back to the radio device 102. As such, the public safety communication device 102 is not spending battery power or processing power operating the voice recognition feature, but is still operating mission critical controls. The appropriate functionality is matched to the best device capable of supporting a specific function.

Figure 2:
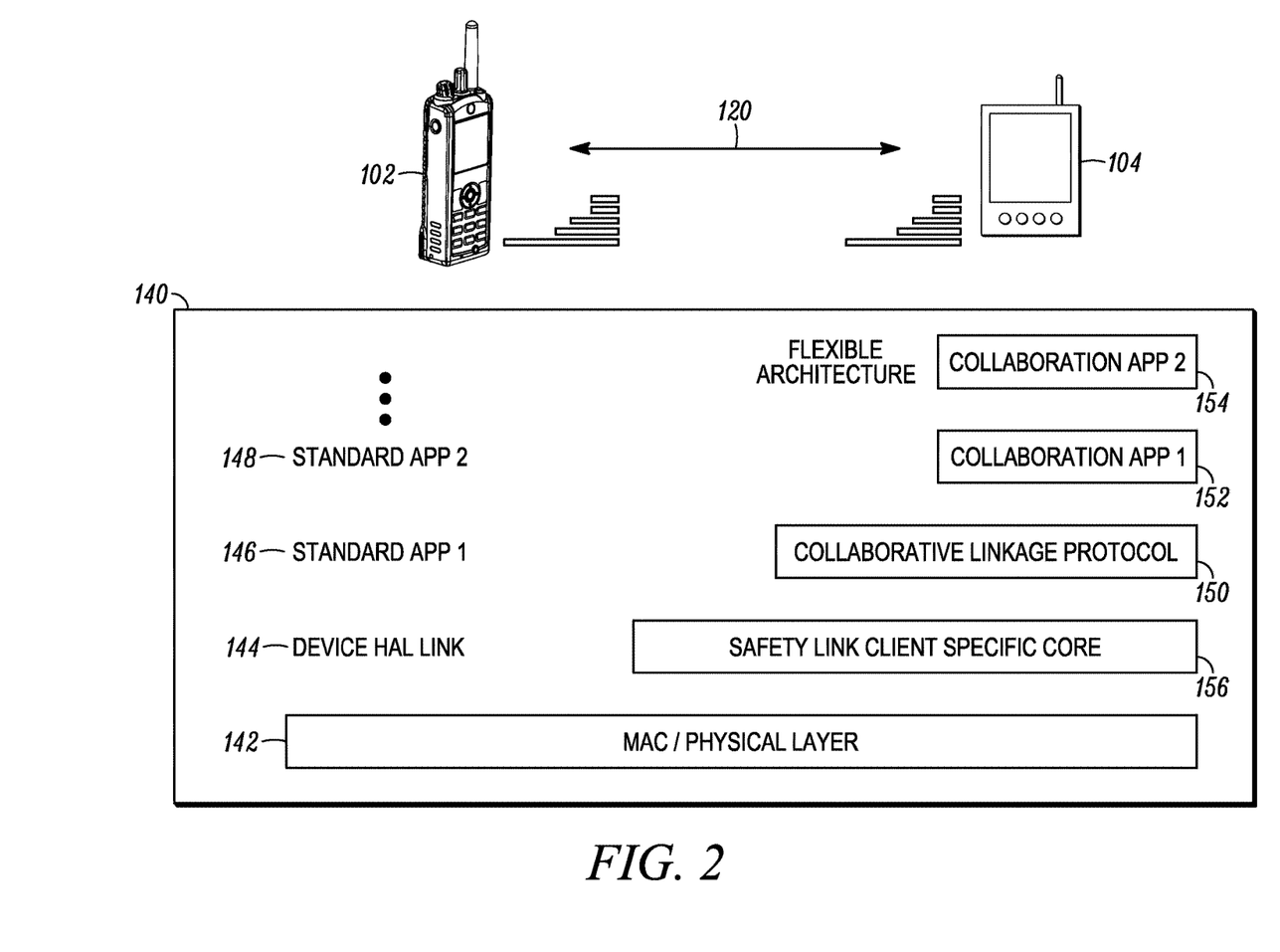
FIG. 2 is a more detailed view of a linkage application of FIG. 1 in accordance with an embodiment of the invention.

FIG. 2 provides a more detailed view and discussion of the linkage application 140 and the interoperation of devices 102 and 104. Application 138 is similarly formed except for specific narrowband radio operational aspects. Referring to linkage application 140, the linkage application comprises first and second standard applications (up to N) 146, 148 for standard operation of the first and second communication devices. Linkage application 140 comprises first and second collaboration applications 152, 154 which provide utilization of features and aspects local to each device (examples include but are not limited to: user interface, speaker, LEDs, transmitter/receiver). A collaborative linkage protocol 150 is provided for managing the first and second collaboration applications 152, 154 during the expanded mode of operation. The collaborative linkage protocol 150, in conjunction with the collaboration applications 152, 154, provide a flexible architecture for operating under the shared mode of operation (for example to provide the expanded public safety mode of operation). The first and second devices 102, 104 revert back to operation under the first and second standard applications 146, 148 when not operating under the expanded public safety mode of operation. Also included in the linkage application 140 are safety link client specific core features for both narrowband and broadband devices. A MAC/physical layer 142 also provides a common connectivity where the access logic is based upon a revenue or distribution specific model.

While a common version of software application for common level communication is provided via collaborative linkage protocol 150, the linkage applications 138, 140 do not require the exact same software due to the need to support different types of communication devices and hardware, such as when the devices 102, 104 are embodied as a public safety radio and a data device. The sharing link communication 120 does not assume a physical layer protocol, however a Bluetooth or other short range technologies are suitable candidates if desired. Given the typical narrowband or broadband devices 138, 140 already contain some type of physical layer 142, a common software linkage protocol 150 allows for linkage of heterogeneous types of devices. With the collaborative linkage protocol 150, vendors can provide linkage applications 138, 140 that utilize the linkage protocol 150 to determine what collaboration features can be offered to other devices, through collaborative application 1, 152 and collaborative application 2, 154L The collaborative linkage protocol 150 allows a vendor the opportunity to offer software that can have elements that exist on both (or up to N) devices or just individually given the type of user interface and information processed. The ability of the devices to be uploaded and interact is thus a benefit which provides premium value to the vendor. The uploading of these applications is the subject matter of FIG. 3.

The distribution of different linkage applications 138, 140 is accomplished by the inclusion of the linkage protocol 150 that allows the devices to communicate shared capabilities. For example, a user 106 can purchase a radio 102 with text messaging feature, purchase a PDA 104 with some local/broadband applications, and purchase a radio linkage application and a PDA linkage application. With this additional linkage software, the entry of text message can be handled via the PDA. The text message approach in the radio does not need to change. But, the user experience is improved with the inclusion of the PDA, while not impacting PDA functions. As such, distribution of applications to communication devices 102, 104 can occur when the devices are already in the field. By providing communication devices 102, 104 with linkage applications 138, 140, the linkage application when enabled, allows sharing of user interface elements such that the first communication device 102 can control the second user interface element and the second communication device 104 can control the first user interface element. The linkage applications, such as linkage application 140 include collaboration features 152, 154 which are controlled by linkage protocol 150. The linkage application 140 may be enabled in response to a user input enabling a collaboration feature at the communication devices. The first communication device 102 reverts to controlling the first feature and the second communication device 104 reverts to controlling the second feature in response to another user input disabling the collaboration feature.

Figure 3:
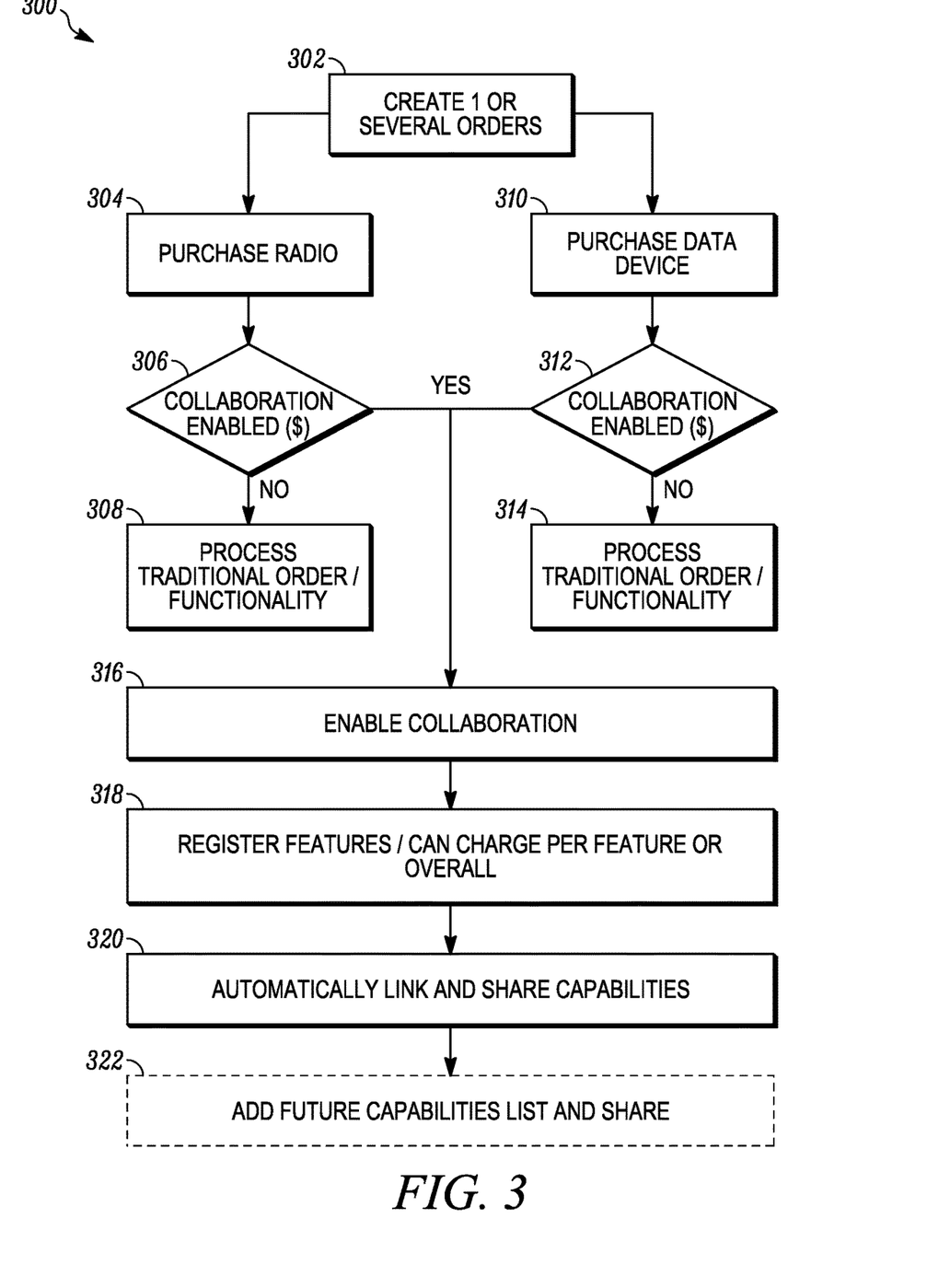
FIG. 3 is a method for distribution of the linkage application to communication devices in accordance with an embodiment of the invention.

FIG. 3 is a flowchart of a method of distributing the linkage applications 138, 140 to communication devices in accordance with an embodiment of the invention. The flowchart provides a method 300 that describes the ordering and alignment (management) process for acquiring and loading the application software to the communication devices. The various steps outline the user interaction for acquiring and loading the applications. The method 300 provides an example of a radio and PDA being ordered with the option choice enabling the linkage software per product.

Beginning at 302 one or more purchase orders are created for a first communication device 102, such as a radio, being purchased at 304 and a second communication device 104, such as a data device, being purchased at 310. At 306 and 312, a determination is made as to whether collaboration is enabled at each device. The collaboration feature being enabled at each device 102, 104 results in additional revenue to the ordering process. If collaboration is not enabled at 306, 308, the order proceeds to be processed in a traditional manner with traditional device functionality at 308 and 314.

If collaboration is enabled at both devices at 306, 312, then collaboration is enabled between the two devices at 316. Enabling the collaboration at 316 allows for predetermined operating features, preferably user interface elements, to be registered and depending on how the order has been placed additional fees can be charged for these features at 318. The communication devices 102, 104 are then automatically linked (via information sharing link 120 using linkage applications 138, 140) to share capabilities of the registered features at 320. Additionally, devices having this link and share capabilities can also have future capabilities added and shared at a later time if desired at 322.

Method 300 enables ease of distribution of the applications for the safety link. Various applications can be delivered by this process, but in particular the distribution of public safety applications is desirable in order to enhance a user's ability to manage numerous communication devices in a public safety environment. Process 300 provides valuable support for the distribution for the establishment of a communication system having a safety net operation.

This distribution method 300 enhances the overall value of a system as it provides the ability to quickly and easily establish devices that operate over a safety link. This can be accomplished for N products and the linkage advantageously occurs in the field—not at a factory. Thus, field replacement concerns are no longer an issue. A new item can be introduced into the safety net, as the safety link can be established to replace a faulty unit. Alternatively, the linkage software can be enabled for specific operation. Thus, in-field upgrades can be achieved without having to alter any of the installed software or and infrastructure based server (such as dispatch and information management center 124 of FIG. 1) can be used to download the linkage software. Both of these approaches to distribution of the linkage software provide for expanded public safety mode of operation through the collaborative operation between the two devices.

The various embodiments provided herein allow for the distribution of content to a plurality of communication devices. By determining what types of applications currently exists in pre-selected communication devices and determining which operating features within the plurality of communication devices can be shared, then a selection of at least some of the features to be shared can be made. Once the selection is made, the linkage application is uploaded to each of the plurality of communication devices to enable sharing of the selected features between the two communications devices. The communication devices selectively operate in an independent mode or in a collaborative mode, wherein the selection of the collaborative mode causes pairing the plurality of communication devices over the shared link for predetermined usage of the shared features.

The linkage application and the sharing aspect of the application allow the features to add value to both devices. For example, certain user interface elements (display, loudspeaker, keyboard, to name a few) need not be duplicated, but rather the optimum user interface elements are used on one of the devices.

Accordingly the paired communication devices accomplish their general responsibilities and the second device (or N devices) is/re used to add benefits to the original device. The resulting communication system operates in peer-to-peer interactions with the benefits of bi-directional control.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A method of distributing applications to a plurality of communication devices, comprising:
   determining what type of applications currently exist in the plurality of communication devices, the plurality of communication devices being under a user's local control;
   determining which features within the plurality of communication devices can be shared;
   selecting a feature to be shared among the plurality of communication devices;
   uploading a linkage application to the plurality of communication devices responsive to the selection of a feature, to enable sharing of the selected feature between at least two of the plurality of communication devices;
   selectively operating the at least two communication devices in an independent mode or in a collaborative mode, wherein the selection of the collaborative mode causes pairing of the plurality of communication devices over the shared link for predetermined usage of the shared feature at a most appropriate device of the at least two communication devices for controlling the shared feature;
   when operating in a the collaborative mode, controlling a delivery of public safety information to a the most appropriate communication device of the at least two communication devices, by a safety net application that supports peer to peer sharing of public safety information and status between the at least two communication devices and
   wherein when operating in the collaborative mode, user interface elements are not operationally duplicated between the at least two communication devices.

2. The method of claim 1, wherein the linkage application is uploaded within the field.

3. The method of claim 1, wherein the linkage application manages the operation of the at least two communication devices during a public safety mode of operation.

4. The method of claim 1, wherein the sharing occurs over a short range network.

5. The method of claim 1, wherein: of the at least two communication devices, at least a first of the plurality of communication devices comprises a public safety device operating over a narrowband network, and at least a second of the plurality of communication devices comprises a non public safety wireless communication device operating over a broadband network during independent operation; and
   both the first and second communication devices operate over a short range network during the sharing mode of operation.

6. The method of claim 1, further comprising:
   uploading the linkage application to the plurality of communication devices while the plurality of communication devices are in the field, the linkage application enabling sharing of the selected features between the at least two communication devices, such that:
   (i) a first of the at least two communication devices controls a second user interface feature of a second of the at least two communication devices; and
   (ii) the second communication device controls a first user interface feature of the first communication device.

7. The method of claim 6, wherein the linkage application is enabled in response to a user input.

8. The method of claim 7, wherein the first communication device reverts to controlling the first user interface feature and the second communication device reverts to controlling the second user interface feature, in response to another user input.

9. The method of claim 6, wherein the first and second communication devices include a collaboration feature, the linkage application being automatically enabled in response to the collaboration feature being enabled.

10. The method of claim 1, wherein the collaborative mode of operation is an expanded public safety mode of operation.

11. The method of claim 1, wherein the linkage application comprises:
    first and second standard applications for standard operation of the plurality of communication devices;
    first and second collaborative applications which provide utilization of features and aspects local to each of the plurality of communication devices; and
    a collaborative link protocol for managing the first and second collaborative applications when operating in an expanded public safety mode of operation.

12. The method of claim 11, wherein the plurality of communication devices revert back to operation under the first and second standard applications when not operating under the expanded public safety mode of operation.

13. The method of claim 11, wherein the first and second collaborative applications provide a flexible architecture for operation under the expanded public safety mode of operation.

14. The method of claim 13, wherein the plurality of communication devices operating in the expanded public safety mode of operation include a public safety radio operating under a narrowband network and a personal digital assistant (PDA).

15. An apparatus comprising:
    a first wireless communication device;
    a second wireless communication device, wherein the second wireless communication device operates on a different communication system than the first wireless communication device, the first and second wireless communication devices being under a user's local control;
    wherein one or more of the first and second wireless communication devices is operable to determine what type of applications currently exist in the first and second wireless communication devices, to determine which features within the first and second wireless communication devices can be shared, and to select a feature to be shared;
    wherein each of the first and second wireless communication devices is operable to upload a linkage application to enable sharing of the selected feature, between the first and second wireless communication devices;
    wherein each of the first and second wireless communication devices is selectively operable in an independent mode or in a collaborative mode, wherein the selection of the collaborative mode causes pairing of the first and second wireless communication devices over a shared link for predetermined usage of the shared feature at a most appropriate device of the first and second wireless communication devices for controlling the shared feature;
    wherein, when operating in a collaborative mode, a safety net application is operable to control a delivery of public safety information to the most appropriate communication device of the first and second wireless communication devices, the safety net application being implemented by one or more of the first and second wireless communication devices and supporting peer to peer sharing of public safety information and status between the first and second wireless communication devices, and wherein when operating in the collaborative mode, user interface elements are not operationally duplicated between the first and second wireless communication devices.

16. The apparatus claim 15, wherein the linkage application is uploaded within the field.

17. The apparatus of claim 16, wherein the linkage application manages the operation of the first and second wireless communication devices during a public safety mode of operation.

18. The apparatus of claim 16, wherein the sharing occurs over a short range network.

19. The apparatus of claim 16, wherein the linkage application uploads to the first and second wireless communication devices while the first and second wireless communication devices are in the field, the linkage application enabling sharing of the selected features between the first and second wireless communication devices, such that:
   (i) the first wireless communication device controls a second user interface feature of the second wireless communication device; and
   (ii) the second wireless communication device controls a first user interface feature of the first wireless communication device.

20. The method of claim 19, wherein the linkage application is enabled in response to a user input.

21. The method of claim 20, wherein the first wireless communication device reverts to controlling the first user interface feature and the second wireless communication device reverts to controlling the second user interface feature, in response to another user input.

22. The apparatus of claim 19, wherein the first and second wireless communication devices include a collaboration feature, the linkage application being automatically enabled in response to the collaboration feature being enabled.

23. The apparatus of claim 15, wherein the collaborative mode of operation is an expanded public safety mode of operation.

24. The apparatus of claim 15, wherein the linkage application comprises:
   first and second standard applications for standard operation of the first and second wireless communication devices;
   first and second collaborative applications which provide utilization of features and aspects local to each of the first and second wireless communication devices; and
   a collaborative link protocol for managing the first and second collaborative applications when operating in an expanded public safety mode of operation.

25. The apparatus of claim 24, wherein the first and second wireless communication devices revert back to operation under the first and second standard applications when not operating under the expanded public safety mode of operation.

26. The apparatus of claim 16, wherein: the first wireless communication device comprises a public safety device operating over a narrowband network, and the second wireless communication device comprises a non public safety wireless communication device operating over a broadband network during independent operation; and
   both the first and second wireless communication devices operate over a short range network during the sharing mode of operation.

27. The apparatus of claim 24, wherein the first and second collaborative applications provide a flexible architecture for operation under the expanded public safety mode of operation.

28. The apparatus of claim 27, wherein the first and second wireless communication devices operating in the expanded public safety mode of operation include a public safety radio operating under a narrowband network and a personal digital assistant (PDA).

* * * * *